United States Patent [19]

Föttinger et al.

[11] 4,431,687

[45] Feb. 14, 1984

[54] METHOD FOR THE MANUFACTURE OF A FABRIC-TYPE ARTIFICIAL LEATHER

[75] Inventors: Walter Föttinger; Erich Fahrbach, both of Weinheim; Kurt Jörder, Weinheim-Heiligkreuz; Karl-Heinz Morweiser, Birkenau; Bohuslav Tecl, Weinheim, all of Fed. Rep. of Germany

[73] Assignee: Firma Carl Freudenberg, Weinheim an der Bergstrasse, Fed. Rep. of Germany

[21] Appl. No.: 379,296

[22] Filed: May 18, 1982

[30] Foreign Application Priority Data

Jul. 10, 1981 [DE] Fed. Rep. of Germany ....... 3127228

[51] Int. Cl.$^3$ .......................... B05D 5/00; B05D 3/12
[52] U.S. Cl. .................... 427/246; 264/45.3; 264/50; 427/355; 427/368; 427/373; 427/387; 427/389.9; 427/412.5
[58] Field of Search ................. 264/45.3, 50; 427/368, 427/373, 389.9, 394, 246, 387, 412.5

[56] References Cited

U.S. PATENT DOCUMENTS

| | | | |
|---|---|---|---|
| 2,972,554 | 2/1961 | Muskat et al. | 264/45.3 X |
| 3,025,202 | 3/1962 | Morgan et al. | 264/45.3 |
| 3,050,427 | 8/1962 | Slayter et al. | 264/45.3 X |
| 3,395,201 | 7/1968 | Kalwaites | 264/45.3 |
| 4,104,435 | 8/1978 | Ballesteros | 264/45.3 X |
| 4,148,854 | 4/1979 | Cordts et al. | 264/45.3 |
| 4,159,294 | 6/1979 | Oishi et al. | 264/45.3 |
| 4,304,817 | 12/1981 | Frankosky | 427/389.9 X |
| 4,346,127 | 8/1982 | Ruvolo et al. | 427/373 X |

FOREIGN PATENT DOCUMENTS 2034195 2/1971 Fed. Rep. of Germany .
2856091 7/1980 Fed. Rep. of Germany .
1917457 11/1969 Netherlands .

*Primary Examiner*—Philip E. Anderson
*Attorney, Agent, or Firm*—Kenyon & Kenyon

[57] ABSTRACT

The present invention provides a method for manufacturing a fabric-type artificial leather, wherein a nonwoven fabric is formed by using a dry method to join together hydrophobic fibers. The fabric so formed is densified by needling and the activation of shrinking forces. It is then impregnated with a mixture of a heat sensitive elastomeric bonding agent, powdered barium sulfate and a compound that reacts with acid to form a gas. The impregnated fabric is then exposed to a heated, acidified liquid which triggers coagulation of the bonding agent and liberates a gas formed by reaction of the acid and acid-reactive compound. The resulting solidified fabric is then washed, dried and ground-over on at least one side to produce a nap. Finally, the fabric is intensively fulled.

22 Claims, No Drawings

METHOD FOR THE MANUFACTURE OF A FABRIC-TYPE ARTIFICIAL LEATHER

FIELD OF THE INVENTION

The present invention relates to a method for the manufacture of a fabric-type artificial leather. The method of the present invention more specifically comprises the preparation of a nonwoven fabric by dry means from hydrophobic fibers, densifying said fabric by needling and the activation of shrinkage forces, thereafter impregnating the fabric with a bonding agent mixture in an aqueous carrier, subsequently exposing the impregnated fabric to an acidified liquid, and finally drying and finishing the fabric.

BACKGROUND OF THE INVENTION

Methods for manufacturing fabric-type artificial leathers are known. One such method is described in DE-OS No. 19 17 457. There, a fabric of shrinkable polyvinyl alcohol (PVA) fibers, densified by needling, is subjected to a shrinking process by immersion in hot water and is treated sequentially or simultaneously with a water-soluble synthetic resin and an aqueous PVA solution. The PVA introduced into the fabric by aqueous solution is subsequently coagulated and cross-linked when the fabric is immersed in acidified formalin. Also during immersion in the formalin, the water-soluble synthetic resin is at least partially removed. However, such removal is a time-consuming process. Moreover, this method is undesirable because it is not possible to carry out the method without interruption, and considerable waste water problems arise. Also, the fabric products are characterized by low mechanical strength and are not suited for applications requiring a high-quality application.

Another method is disclosed in DE-OS No. 19 05 551, wherein a flexible sheet material is described which is particularly suited as a raw material for the manufacture of artificial leather. The product obtained comprises a needled and shrunk nonwoven fabric of PVA fibers with a titer of 0.5 to 2.5 den. The voids of the fabric contain an optional grinding powder and a polymer filler which does not adhere to the fibers, but which hangs together largely via the spaces between the fibers. Due to its high moisture absorptivity, this fabric has little dimensional stability. Furthermore, the feel and drapability differ substantially from the corresponding properties of natural leather, so that this fabric makes a poor substitute for natural leather.

DE-OS No. 28 56 091 discloses a needled and thermally welded nonwoven fabric comprised of multi-component fibers of the matrix-segment type, which fibers are split by heat-induced shrinkage into partial fibers with a titer between about 0.1 to 20 dtex. The planar structure of such a fabric has little mechanical strength and exhibits no properties similar to natural leather.

In DE-OS No. 20 34 195, a method for manufacturing an artificial leather is described, in which composite fibers are combined with an embedment and an island component to form a fabric material, the three-dimensional structure of which is densified by needling. The nonwoven fabric obtained in this manner is then impregnated with a water-soluble polymer, whereupon the embedment is subsequently removed from the fabric by treatment with a solvent. The retained island component is thereby released. The fabric material containing the island component is impregnated with an elastic polymer which solidifies. Subsequently the water-soluble polymer is washed out; the nonwoven fabric is cut parallel to the surface into two pieces, and the surface so obtained is roughened with sandpaper in order to obtain a uniform and dense nap. The method suffers from the fact it is complicated and expensive in practical application. Furthermore, the substantial quantities of organic solvents are removed only with difficulty and pose environmental pollution problems.

In summary, it has been found that there are narrow limits to the practical application of the state of the art methods for manufacturing artificial leather fabrics. One concern is the economic feasibility of the known methods since such methods provide very low production from very expensive facilities, which are otherwise not commonly used in nonwoven fabric products. Another practical limitation of the state of the art methods is the products obtained thereby frequently exhibit undesirable characteristics such as poor light fastness, a brittle feel, poor drapability, unsatisfactory "breathing" and low abrasion resistance. As a consequence, the use of these products for certain high-quality ends, such as covering an automobile seat or manufacturing outerwear becomes at the very least problematical.

It is an object of the present invention to provide a method for economically producing a high-quality artificial leather distinguished by a soft drape, good light fastness, good breathing and good abrasion resistance, with an attractive game leather appearance. The products should be washable in an ordinary home washing machine and should exhibit substantially unchanged the aforementioned properties even after at least fifty washings at a temperature of 50° C. In addition, they should be resistant to all solvents used in dry cleaning such as gasoline, perchloroethylene and fluoridized solvents.

SUMMARY OF THE INVENTION

The present invention provides a method for manufacturing a fabric-type artificial leather, wherein a nonwoven fabric is formed by using a dry method to join together hydrophobic fibers with a titer less than 2 dtex. The fabric so formed is densified to a bulk weight of about 0.15 to 0.45 grams per cubic centimeter (g/cm$^3$), by subjecting said fabric to intensive needling and shrinking forces.

By means of contacting the fabric with an aqueous carrier containing a mixture of a heat sensitive elastometric bonding agent, powdered barium sulfate and a compound that reacts with an acid to form a gas, the fabric is impregnated uniformly with said mixture. The fabric is subsequently exposed to a heated and acidified liquid such that the bonding agent automatically coagulates and a quantity of gas is liberated by virtue of the reaction of the acid and acid-reactive compound, thereby solidifying the fabric.

The solidified fabric is then washed, dried and groundover on at least one side to produce a nap. Finally, the fabric is intensively fulled.

DETAILED DESCRIPTION OF THE INVENTION

In the method of the present invention, a nonwoven fabric is first formed from hydrophobic fibers joined together by a dry method. The fibers can be combined in accordance with known methods to form a planar structure, such as by use of a carding machine or a so-called Rando-Webber.

The fibers themselves should be of a hydrophobic material so that their form does not change appreciably when exposed to moisture. Fibers of polyamide and polyester have been found particularly suitable in use. Although the fiber's diameter is theoretically limited only by availability and processability, the fibers should have a titer of less than 2 dtex as a practical matter so as to obtain a fiber structure of the greatest possible fineness. Fiber titers of 0.2 to 1.7 dtex are preferred. The length of the fibers should be at least 10 millimeters (mm) and preferably, at least 20 mm. It is possible to use endless fibers if suitable spinning facilities are available.

In forming the fabric, the fibers are combined without special preferred orientation, thereby avoiding any directional effects on the bending elasticity of the fabric. Anyway, the fibers are naturally reoriented as a consequence of the intensive needling of the fabric that is part of the densification step of the presently disclosed method. The reorientation is effected largely in a direction perpendicular to the surface of the fabric, resulting in interior mutual fiber entanglement that provides the fabric with high internal strength. By needling on both sides, identical properties on both surfaces can be achieved, including neutral bending behavior in both directions.

The diameter of the individual fibers may be uniform or it may vary within the aforementioned range of less than 2 dtex, preferably 0.2 to 1.7 dtex. When the fiber diameter varies within the range mentioned, the conditions in natural leather are largely duplicated and a product results which has draping and feel properties that are especially leatherlike.

The nonwoven fabric thus described is first formed and densified by intensive needling and shrinking, to a bulk weight of about 0.15 to 0.45 g/cm$^3$. The use of some shrinkable fibers is desirable in that it improves the mutual adhesion of the fibers to each other after needling. If polyamide and/or polyester fibers with a titer of 0.6 to 0.9 dtex are used, the most favorable properties are obtained if about 20% by weight of the fibers are polyester high-shrinkage fibers with a titer of 1.7 dtex. The shrinking of the fibers should not result in a substantial change in thickness of the fabric. The share of shrinkable fibers therefore should not exceed the range of 20% to 30%.

It has been found that the processing of very fine fibers in the customary carding facilities used to form the fabric can lead to difficulties in certain cases. For these cases, it is hereby taught that the fibers may be combined into skeins, comprised of several fibers, thereby providing greater ease in forming the fabric. Thereafter, the cohesion of such skeins is destroyed by needling and/or shrinkage. It is particularly advantageous if only part of the skeins consists of shrinkable fibers because in this case automatic fibrillation and dissolution of the entire skein are effected during the shrinking. Such fibers are described, for instance, in DE-OS No. 28 56 091.

The shrinking of the fabric which can be effected subsequently to the needling, is produced by heating the fabric, preferably by placing it in a liquid such as water, which is heated to a temperature of about 50° to 99° C. The fabric can then be impregnated with a separating agent, such as paraffin or silicone, to prevent the bonding agent, which is introduced later, from sticking to the fibers. As discussed later, the separating agent may be applied in an operation distinct from the shrinking operation.

After densification, the fabric is contacted with an impregnating mixture borne by an aqueous carrier, allowing for uniform impregnation of the fabric. The impregnating mixture comprises a bonding agent, powdered barium sulfate and a further substance, from which a gas is expelled due to the action of the acidified liquid, while the bonding agent is being coagulated. The gas formed within the bubbles and the coagulating bonding agent are uniformly mixed together, whereby a loosely cohering open-pore binder structure is formed within the fabric. This structure does not have great internal strength in the usual sense, but it does lead to an effective increase in fabric strength due to its being embedded in the dense pore structure of the needled and shrunk fabric.

The barium sulfate in powder form, which is included in the more or less loose assembly of fibers and powdered bonding agents, provides a stabilization of the fabric structure by virtue of its uniform distribution throughout the entire fabric cross-section. This results in a reduction in the compressibility of the cross-section, and a distinct increase in surface hardness, which favors formation of the nap during the final grinding.

The bonding agents are exclusively elastically resilient substances, preferably an elastomeric material suspended in aqueous carrier liquids. These materials are adjusted by the addition of suitable sensitizers so that at the beginning of the action of the acidified liquid, spontaneous coagulation takes place in parallel with the gas development which occurs. The coagulation can be optionally accelerated and/or intensified by the addition of salts to the acidifed solution later contacted with the impregnated fabric. Such salts as calcium chloride or aluminum sulfate, which form multivalent ions, may be beneficially used. By use of such salts, the bonding agent is prevented from further relocation and is uniformly distributed over the entire cross-section of the fabric. After any diffused residual water in the fabric is removed by drying, the coagulated bonding agent will be crosslinked in the usual manner, preferably by temporary heating to a temperature of about 120° to 170° C. Squeezing out the diffused residual water must be avoided at all costs.

Of the available elastomeric bonding agents, the polyacrylates are particularly well suited, as are also the polyurethanes optionally suited for solidifying the fabric. The viscosity of the aqueous suspension of the bonding agent is adjusted such that the dry weight of bonding agent absorbed by and impregnated in the fabric is identical (with a permissable deviation of ±25% to ±50%) to the weight of the fiber mass itself. The polyacrylate dispersion may include an internal separating agent in order to prevent the bonding agent particles from being cemented to each other during coagulation. Surprisingly, the use of such an internal separating agent, e.g., a silicone dispersion, does not lead to an appreciable decrease in fabric strength. Due to the use of an internal separating agent, the bonding agent is present in the finished artificial leather in the form of a so-called caviar structure.

Together with the bonding agent, a water-insoluble carbonate, an entirely water-soluble carbonate, and/or a partially water-soluble carbonate is added to the fabric. As a result of the addition of this substance carbon dioxide gas is split off during the subsequent treatment of the fabric with an acidifed liquid, and this results in a further loosening of the binding agent agglomeration present in the interior of the fabric. Also, the loosening of the bonding agglomeration caused by the liberation of the gas, has the advantage of improving the fabric's softness as well as its "breathing" characteristics. Solid substances, e.g. chalk, must be milled completely to ensure a fine and uniform distribution.

Suitable water-insoluble carbonates include magnesium carbonate, calcium carbonate and/or barium carbonate is finely distributed powder form. Partially water-soluble carbonates include sodium bicarbonate, while water-soluble carbonates include sodium carbonate, potassium carbonate, or mixture thereof. The insoluble substances have the advantage of targeted adsorption of the suspended bonding agent particles, while the water-soluble substances on the other hand have the advantage of better penetration of the needled and shrunk fabric which has only very fine pores. The amount of added carbonate should be about 0.5 to 10% by weight, based on the dry weight of the bonding agent.

After the fabric is impregnated with the mixture of bonding agent, barium sulfate and carbonate, it is contacted with an acidified solution that has a temperature higher than the coagulation temperature of the bonding agent. As a consequence of the carbon dioxide gas bubbles, formed by reaction of the carbonate and acid, being uniformly mixed with the coagulating bonding agent, a loosely cohering, open-pore binder structure is obtained within the fabric.

Any residual acids, coagulation and dispesion aids contained in the fabric may be removed in a subsequent washing in clear water at a temperature of 50° C., and can be retained for reuse. After drying, at least one side of the fabric is overground to produce a velour-like nap.

The softness of the fabric, which has been ground-over on one or both sides after the densification, can be improved by intensive fulling. Any known method is suitable if it can be used to effectively destroy the cohesiveness of the foam-like bonding agent layer contained in the fabric. A mere partial breaking-up of this layer, e.g., at a mutual spacing of greater than 1 centimeter, leads to unsatisfactory results. Moreover, such partial destruction of the layer may lead to an actual increase in the fabric's bending strength, noticeable within a few weeks.

In order to effect a permanent, satisfactory softness, it is important that the final fulling of the fabric is performed with particular intensity. It has been found that a cylinder fulling machine is best suited for this purpose because the resultant, treated artificial leather exhibits a high quality softness. Such a machine has not been used to date for the treatment of planar textile products of synthetic fibers. In using a cylinder fulling machine, the fabric is pushed into a fulling chamber against a flap pressure of 0.5 to 5 kg/cm². Subsequently, the fulled fabric may be washed, and smoothed on a stretching frame in order to eliminate any creases that may have been produced.

After the final drying, the feel, appearance, sensitivity and properties of the finished artificial leather can be improved further by application of certain per se known finishing measures, such as a final fine overgrinding, brushing and treatment with customary textile finishing agents adapted for use in particular applications. More specifically, the fineness of the appearance of the velour-like surface can be improved by light overgrinding and subsequent brushing-out. The dirt-repelling properties and the leather-like feel can be improved further by impregnating the fabric with or spraying onto the fabric, silicone of fluorinated organic compounds.

The artificial leather produced by the method of this invention can be dyed by observing the known rules in all desired process steps. In cases where the fibers used react differently than the bonding agent to a particular dye, it is advantageous to pre-dye the fabric, before impregnation with the bonding agent. The bonding agent, containing a suitable pigment, may then be added.

The artificial leathers, obtained by practicing the above-described method, are well suited as substitutes for natural leather in even critical applications, such as in the manufacture of ladies wear, overcoats, jackets or coverings for automobile upholstery. In all these applications, the insensitivity to dirt in conjunction with excellent breathing activity, softness, abrasion resistance and light fastness are of particular importance. To this extent, the artificial fabric, produced according to this invention, combines numerous advantages of the highest quality of natural leather with advantages which cannot be expected of the natural product.

The invention will be explained in greater detail, referring to the following examples:

EXAMPLE 1

By means of carding machines and traversing depositing machines, a multi-directional fabric of the following fiber composition was put down:
20% high-shrinkage polyester 1.7 dtex/51 mm
80% polyester 0.9 dtex/38 mm
It was subsequently brought to a density of 0.13 g/cm³ and a thickness of 1 mm by needling. Subsequently, the fabric was placed in a paraffin dispersion heated to 95°, which had a paraffin content of 5%. The fabric shrunk spontaneously by 19% linear; the thickness was increased by 10% to 1.1 mm. This corresponds to an increase of the density of the fiber fabric to 0.21 g/cm³. The fabric was squeezed off, after the shrinkage, to a wet absorption of 200%. It was then dried.

Subsequently, the material was impregnated with an aqueous liquid of the following composition:

| | | |
|---|---|---|
| polyacrylate dispersion (50% solid content) | 160 | parts by wt. |
| polyurethane dispersion (40% solid content) | 50 | " |
| heavy spar (baryte meal) | 50 | " |
| pigment distributor | 8 | " |
| silicone dispersion (30% solids content) | 12 | " |
| chalk (milled) | 10 | " |
| water | 70 | " |
| | 360 | " |

The wet absorption after the squeezing is 350%.

The impregnated and squeezed-out material was put in an acidified precipitation bath which consisted of a solution of 2% maleic acid and 3% aluminum sulfate in water at a temperature of 90° C. Coagulation set in spontaneously, developing foam.

Subsequently, the material was dried and condensed at a temperature of 160° C. The material was then ground to a thickness of 0.9 mm.

Subsequently, the material was fulled intensively in a commercial cylinder fulling machine for two hours at a flap pressure of 1.1 kg/cm².

The material was then washed and dyed with dispersion dye in an HT dyeing equipment at 130° C. and subsequently impregnated wet-on-wet with a commercially available spot protection finish with a fluorocarbon base.

Subsequently, the fabric was dried in a stretching frame at 110° C.

Finally, the material was ground-over once more on one side, giving it a thickness of 0.8 mm. It was also brushed on the ground side.

A very soft drapable material with a pleasant sheen and high permeability of water vapor was obtained which is particularly suitable for application in car upholstery.

EXAMPLE 2

By means of carding machines and traversing depositing machines, a multi-direction fabric was formed and consolidated by needling. The fabric consisted of staple fibers of the following type:

Matrix segment fiber with a titer of 1.8 dtex/40 mm of 80% by weight PES-high shrinkage (6 segments) and 20% by weight nylon 6 (matrix) according to DE-OS No. 28 56 091.

After the needling, the fabric had an area weight of 140 g/m$^2$ and a thickness of 1.06 mm.

The needled fabric was treated with methylene chloride at 30° C. whereby it acquired an area weight of 230 g/m$^2$ and a thickness of 1.15 mm due to the spontaneous shrinking process. At the same time, fibrillation took place.

The shrunk fabric was then dyed in an HT dyeing equipment with dispersion dye.

Subsequently, the fabric was first impregnated wet-on-wet with a silicone oil emulsion and then dried so that the dyed needle fabric contained a silicone coating of 5% by weight.

Subsequently, the material was impregnated with an impregnating mixture of the following composition:

| | |
|---|---|
| polyacrylate dispersion (50% solids content) | 200 parts by wt. |
| heavy spar (baryte meal) | 50 |
| pigment distributor | 8 |
| pigment dye | 2 |
| silicone dispersion (30% solids content) | 18 |
| chalk (milled) | 2 |
| water | 70 |
| | 350 |

The wet absorption after squeezing out was 310%.

The impregnated and squeezed material was placed in an acidified precipitation bath which consisted of 2% maleic acid and 4% calcium chloride in water at a temperature of 96°.

Coagulation set in spontaneously, developing foam.

Subsequently, the material was dried at a temperature of 130° C., and condensed.

The dried and condensed material was brought to a thickness of 0.95 mm by grinding on both sides.

The ground material was fulled intensively in a cylinder fulling machine for three hours at a flap pressure of 2.5 kg/cm$^2$. Immediately after, the material was washed in a jet washing machine and then impregnated by a drawing process with a cationic silicone dispersion.

The material was then dried in a stretching frame at 110° C.

Finally, the material was brought down to a thickness of 0.9 mm by grinding-over on both sides. The nap and sheen were optimized by brushing.

The material was extremely soft and drapable and its appearance and feel hardly distinguishable from genuine kidskin. It therefore was particularly well suited for the manufacture of ladies wear. It had the advantage over the natural product that it can be washed as well as dry-cleaned without noticeable change in feel and appearance.

Determining the drapability according to DIN 54 306-79 shows a draping coefficient of 39%.

EXAMPLE 3

A material was produced in the same manner as in Example 2 with the sole difference that no fulling operation was carried out.

The draping coefficient is 46%.

EXAMPLE 4

A material was produced in the same manner as in Example 2, but with the difference that the following impregnating mixture was used:

| | |
|---|---|
| polyacrylate dispersion (50% solids content) | 200 parts by wt. |
| heavy spar (baryte meal) | 50 |
| pigment distributor | 8 |
| pigment dye | 2 |
| silicone dispersion (30% solids content) | 18 |
| water | 72 |
| | 350 |

In the material so produced, the draping coefficient was 52%.

EXAMPLE 5

A material was prepared in the same manner as in Example 2 but with the difference that the following impregnating mixture was used:

| | |
|---|---|
| polyacrylate dispersion (50% solids content) | 200 parts by wt. |
| heavy spar (baryte meal) | 50 |
| pigment dye | 2 |
| water | 78 |
| | 330 |

In the material so prepared, the draping coefficient was 70%.

EXAMPLE 6

A material was produced in the same manner as in Example 5, but with a difference that the impregnation of the dyed needled fabric with silicone was omitted.

The draping coefficient was 77%.

What is claimed is:

1. A method for manufacturing a fabric-type artificial leather, comprising:
   a. forming a nonwoven fabric by using a dry method to join together hydrophobic fibers with a titer less than 2 dtex;
   b. densifying said fabric to a bulk weight of about 0.15 to 0.45 grams per cubic centimeter, by subjecting said fabric to intensive needling and by activating shrinking forces;
   c. uniformly impregnating said densified fabric, by means of an aqueous carrier containing a heat sensitive elastomeric bonding agent, powdered barium sulfate and a compound that reacts with an acid to form a gas;
   d. exposing said impregnated fabric to an acidified bath which has been brought to a temperature higher than the bonding agent's coagulation temperature, so that the bonding agent spontaneously coagulates and a gas is simultaneously formed from the reaction of the acid and acid-reactive compound, said exposure providing an open pore structure in said bonding agent;

e. washing and drying said fabric containing the coagulated bonding agent;

f. grinding-over at least one side of said washed and dried fabric so as to produce a nap; and g. finally, intensively fulling said fabric.

2. A method as recited in claim 1 wherein the hydrophobic fibers comprise shrinkable and non-shrinkable fibers.

3. A method as recited in claim 2 wherein said hydrophobic fibers comprise 15 to 30% by weight of shrinkable fibers, based upon the total weight of both shrinkable and non-shrinkable fibers.

4. A method as recited in claim 1, 2 or 3 wherein the hydrophobic fibers used to form the nonwoven fabric have been combined to form ropes of several fibers, thereby facilitating the formation of the fabric, and wherein the cohesiveness of said ropes is destroyed during the needling and/or shrinking.

5. A method as recited in claim 4 wherein said shrinking forces are activated by heating the fabric, and furthermore are activated after the needling of the fabric.

6. A method as recited in claim 5 wherein heating of the fabric is accomplished by immersing it in a liquid at a temperature between about 50° to 99° C.

7. A method as recited in claim 6 wherein the fabric is impregnated with a separating agent while being immersed in said liquid at a temperature of about 50° to 99° C.

8. A method as recited in claim 7 wherein said separating agent is selected from the group consisting of silicone and paraffin.

9. A method as recited in claim 8 wherein the bonding agent is selected from the group consisting of a polyurethane, a polyacrylate, and combinations thereof, in suspension; the viscosity of said suspension being such that the dry weight of the bonding agent impregnated in the fabric is identical with a permissible deviation of ±50% to the weight of the fabric itself.

10. A method as recited in claim 9 wherein said suspension has an internal separating agent mixed therein.

11. A method as recited in claim 10 wherein said internal separating agent comprises a silicone dispersion.

12. A method as recited in claim 11 wherein said compound that reacts with acid to form a gas is selected from the group consisting of a water-insoluble carbonate, a completely water-soluble carbonate, a partially water-soluble carbonate, and mixtures thereof.

13. A method as recited in claim 12 wherein:

a. the water-insoluble carbonate is selected from the group consisting of magnesium, calcium and barium carbonate and mixtures thereof;

b. the completely water-soluble carbonate is selected from the group consisting of sodium carbonate, potassium carbonate, ammonium carbonate, and mixtures thereof; and c. the partially water-soluble carbonate is selected from the group consisting of sodium bicarbonate, lithium carbonate, and mixtures thereof.

14. A method as recited in claim 13 wherein the volume of gas formed by the reaction of acid and the acid-reactive compound is at least as great as the volume of the bonding agent itself.

15. A method as recited in claim 14 wherein the fulling of the fabric is performed in a cylinder fulling machine.

16. A method as recited in claim 15 wherein said cylinder fulling machine pushes the fabric into a fulling chamber against a flap pressure of 0.5 to 5 kg/cm$^2$.

17. A method as recited in claim 16 wherein said flap pressure is 0.8 to 3 kg/cm$^2$.

18. A method as recited in claim 16, further comprising the step of smoothing the fabric in a stretching frame, subsequent to the fulling operation.

19. A method as recited in claim 18 further comprising treating the product of claim 18 by finely grinding it.

20. A method as recited in claim 18 further comprising the step of brushing the fabric product of claim 18.

21. A method as recited in claim 18 further comprising the step of finishing the fabric product of claim 18 with finishing agents.

22. A method as recited in claim 21, wherein the finishing agents are selected from the group consisting of a resin, paraffin, silicone, a fluorine-containing compound, and any combination thereof.

* * * * *

UNITED STATES PATENT AND TRADEMARK OFFICE
CERTIFICATE OF CORRECTION

PATENT NO. : 4 431 687
DATED : February 14, 1984
INVENTOR(S) : Walter Föttinger et al It is certified that error appears in the above-identified patent and that said Letters Patent is hereby corrected as shown below:

In column 7, line 64, change "...of 0.9 mm..." to read ---...of 0.90 mm ..--

Signed and Sealed this

Fifth Day of June 1984

[SEAL]

Attest:

Attesting Officer

GERALD J. MOSSINGHOFF

Commissioner of Patents and Trademarks